(No Model.)
C. BARNARD.
THEATRICAL APPLIANCE.
No. 422,362. Patented Mar. 4, 1890.
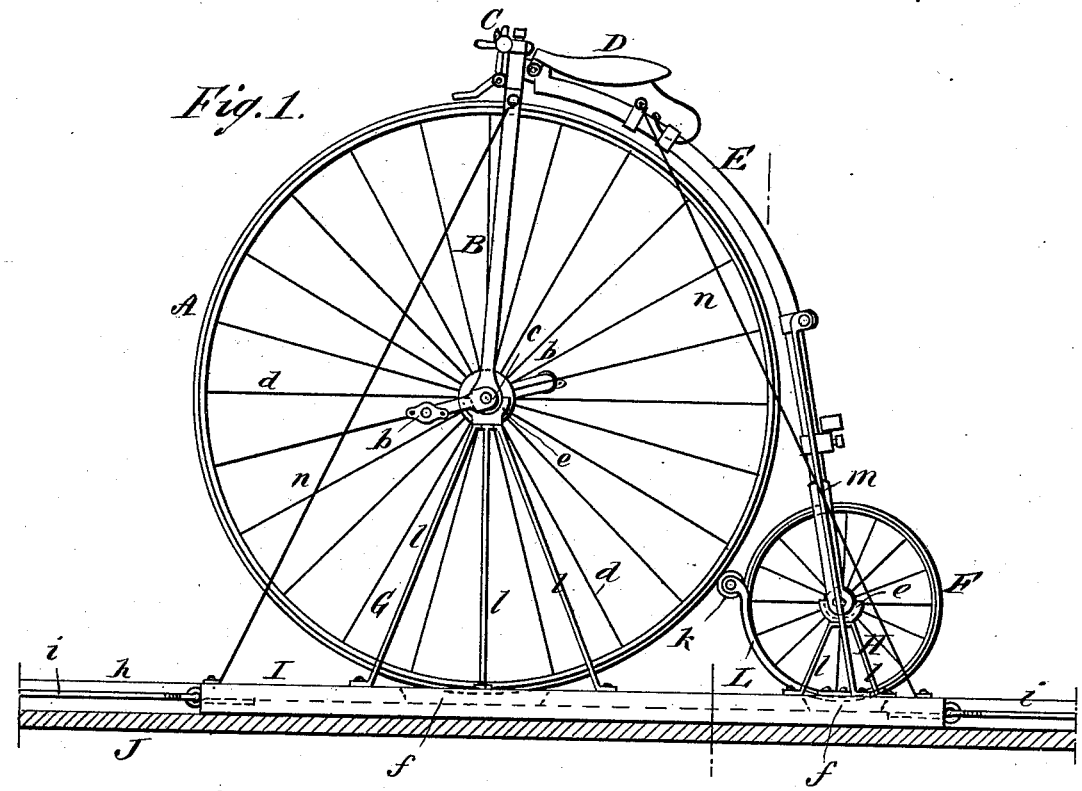
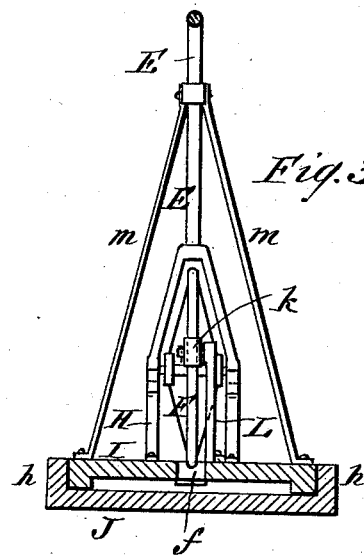
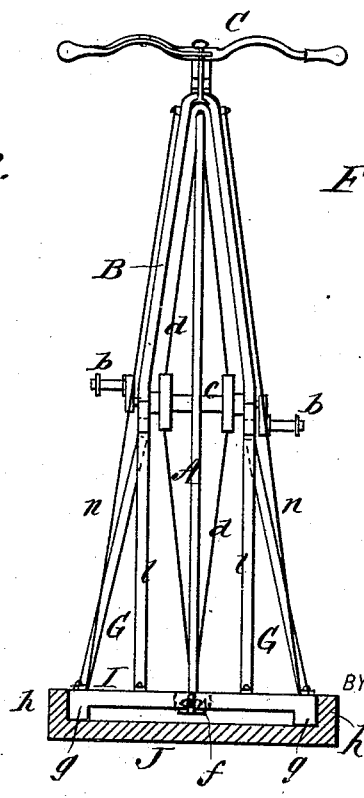
WITNESSES:
Dom Twitchell
C. Sedgwick
INVENTOR:
C. Barnard
BY Munn & Co.
ATTORNEYS.

UNITED STATES PATENT OFFICE.

CHARLES BARNARD, OF STAMFORD, CONNECTICUT.

THEATRICAL APPLIANCE.

SPECIFICATION forming part of Letters Patent No. 422,362, dated March 4, 1890.

Application filed December 26, 1889. Serial No. 335,023. (No model.)

*To all whom it may concern:*

Be it known that I, CHARLES BARNARD, of Stamford, in the county of Fairfield and State of Connecticut, have invented a new and useful Improvement in Theatrical Appliances, of which the following is a full, clear, and exact description.

This invention has for its object the introduction onto the stage of a theater of a vehicle appliance in motion, which, while it is mounted and worked by the actor to give the desired scenic effect, is independently slid or drawn on or over the stage to give to it its required travel.
The invention consists in a pedal-wheel vehicle—such as a bicycle or velocipede of any approved construction—capable of being mounted and having its pedals free to be operated by the actor, but having its wheel or wheels raised from contact with the ground surface on which the vehicle appears to run by means of a traveling sled or slide on which the vehicle is mounted; and the invention includes a means for communicating motion from the pedal-wheel of the vehicle to the other thereof, special constructions of the frames by which the vehicle is mounted on the slide or sled, by which it is moved over the stage, and a track or guide for the sled constructed to conceal the same, substantially as hereinafter described. Such theatrical appliance will present the appearance of a bicycle with its rider traveling by the action of the rider or actor on its pedals over the stage, and in case of a number of such appliances, arranged, say, side by side, of a series of such vehicles, mounted by their riders, as engaged in a bicycle-race, but in reality being controlled by the arrangement of the slides carrying said vehicles, one behind or in advance of the other, and by the pull or draft made upon the slides or sleds upon which the vehicles and their riders are mounted.
Reference is to be had to the accompanying drawings, forming a part of this specification, in which similar letters of reference indicate corresponding parts in all the figures.

Figure 1 represents a side elevation of a theatrical appliance, substantially as above referred to, embodying my invention, with the track in which the carriage moves, on which the bicycle is mounted, in section. Fig. 2 is a front view of the same; and Fig. 3, a sectional vertical view, looking backward, taken immediately in front of the rear wheel of the vehicle.

A indicates the main or pedal wheel of the vehicle, *b b* its pedals, *c* the axle or shaft of said wheel, and *d d* its spokes.

B is the main fork connecting said axle with the steering-head, C the steering handles or bars, and D the saddle or rider's seat.

E is the backbone extending down from the steering-head and forked at its lower end to receive the rear wheel F within it. All of these parts may be of any suitable construction, or of the usual construction in ordinary bicycles.

The whole vehicle is mounted upon two standards or frames G H, the one for the front and the other for the rear wheel, the axles or lower ends of the forks which carry said wheels resting in cup-shaped bearings *e e* on the tops of said frames, which latter in their turn are bolted or secured at their lower ends to a lower slide or sled I, the wheels being fitted to turn free from contact below within recesses *f f*, made in the top of the sled. This slide or sled I is arranged to travel, by means of opposite side runners *g g*, in and along a gutter-like track or raceway J, that may extend all across the stage, and which has upturned sides *h h*, for the double purpose of guiding the sled and of concealing it from view of the audience.

The whole sled, with the vehicle mounted upon it, or upon the frames G H, erected thereon, may be drawn and controlled in its travel across the stage within the raceway J by means of ropes *i i*, attached to the front and back ends of the sled and leading to or beyond the side scenes, where they may be suitably manipulated, the actor or rider on the seat of the vehicle simultaneously working the pedals to rotate the freely-running main wheel A, and holding onto the handle-bars C, which will give the impression that the vehicle is being propelled by him. To carry out this illusion, the freely-running rear wheel F is also rotated by means of a small friction-roller *k*, interposed between the two wheels and carried by a standard or arm L, secured below to the sled, and curved to conform to the rim of the rear wheel, as seen from its side, so as to be wholly indiscernible by the audience, and the friction driving-roller $k$ being only small it will escape notice. The standards or frames G H too, which carry the two free running wheels A F, are mainly made up of bars or uprights $l\ l$, arranged to incline or conform to the spokes of said wheels, being drawn from the centers or axes thereof, and being of a thin-edge-shaped construction, with their thin edges in sidewise relation to the vehicle, so that they will be scarcely or not at all distinguishable from the spokes of the rapidly-rotating wheels, thus further serving to conceal how the vehicle is supported.

To brace the vehicle in position on its sled and to further carry out the illusion, inclined braces $m\ m$, having a thin edge sidewise presentation, are extended from the sides of the sled in its rear up to and in line with the forked backbone E, and connected at their upper ends with the latter. Light guy ropes or rods $n\ n$ are or may also be used on both or opposite sides of the vehicle to further brace the vehicle, said guy-rods being set inclining from the back and front of the sled to the upper end of the main fork B and upper portion of the backbone E, which guy-rods will barely, if at all, be visible from a distance.

Such theatrical appliance may be ridden by any actor who is merely capable of working the pedals without any risk of accident and without any special effort as regards speed, the travel of the vehicle across or over the stage being controlled by the ropes $i\ i$, attached to the sled and manipulated by others out of sight of the audience, and yet the effect to the audience will be that the rider or actor is propelling the velocipede or vehicle by the working of the treadles or pedals.

Having thus described my invention, I claim as new and desire to secure by Letters Patent—

1. In theatrical appliances, a pedal-operated wheel vehicle provided with a rider's saddle or seat, in combination with a sled, on which the vehicle is mounted for independent operation from a fixed position relatively to the sled, and a gutter-like track or raceway adapted to receive, guide, and conceal said sled within it, essentially as herein set forth.

2. In theatrical appliances, a bicycle mounted for independent operation upon a sled, and provided with a friction-roller interposed between the main or front and rear wheels for rotating the rear wheel, substantially as specified.

3. In a bicycle theatrical appliance, the combination, with the sled upon which the bicycle is mounted, and front and rear wheels of the vehicle, of a rear-wheel friction driving-roller interposed between the front and rear wheels, and an arm or standard carrying said roller attached to said sled and curved to conform to the rim of the rear wheel, essentially as described.

CHARLES BARNARD.

Witnesses:
  C. SEDGWICK,
  A. SURCOTT.